UNITED STATES PATENT OFFICE 2,143,228

PROCESS OF PREPARING CONDENSATION PRODUCTS

Ludwig Orthner and Willy Selle, Frankfort-on-the-Main, Germany, assignors to I. G. Farbenindustrie Aktiengesellschaft, Frankfort-on-the-Main, Germany No Drawing. Application September 8, 1936, Serial No. 99,858

7 Claims. (Cl. 260—2)

The present invention relates to a process of preparing condensation products of carbonyl-compounds with products obtainable by saponifying an organic polyvinyl ester.

The condensation products of polyvinyl alcohol with carbonyl-compounds, especially aldehydes, are suitably prepared in organic solvents which are not miscible with water, as they are described for instance in U. S. A. Patent No. 2,044,730. Owing to the viscosity of the condensation products the solvents for the isolation of the acetals cannot be removed by a direct distillation and a precipitation of the solution by a non-solvent would render the isolation extremely expensive. The high viscosity of the products is likewise troublesome when the solvent is eliminated with the aid of steam because during this operation viscous lumps are separated which can neither be removed from the vessel nor be freed by washing from impurities such as acids or salts.

Now we have found that it is possible to isolate in a finely divided form the condensation products of vinyl alcohol with carbonyl-compounds from their solution in water insoluble solvents by emulsifying these solutions in water and distilling the solvent from the emulsions produced. The procedure may be as follows: The emulsion obtained from water and the solution with addition of emulsifying agents is distilled with steam, while vigorously stirring, until all of the solvent has been removed or the emulsion may be caused to enter, while strongly stirring and introducing steam, into hot water to which suitably a new emulsifying agent or dispersing agent has been added; during this operation the solvent distils.

The boiling point of the solvent must be lower than that of water. There may be used for instance benzene, ethylene chloride, chlorinated methanes such as methylene chloride, chloroform, carbon tetrachloride, furthermore trichlorethylene, dichlorethylene, cyclohexane or fractions of benzine.

By this process the condensation products are obtained in a finely divided form and can be removed from the vessel without difficulty, filtered with suction and freed, by washing them, from the emulsifying agents used and from other impurities. By the selection of suitable emulsifying agents or dispersing agents or mixtures of emulsifying and dispersing agents as well as by varying the concentration of the emulsifying agents the condensation products may be obtained as small porous particles or as a sandy or very fine powder.

As emulsifying agents there may be used soaps, alkylated or aralkylated naphthalene sulfonic acids, condensation products of fatty acids with hydroxy alkyl sulfonic acids or aminoalkyl sulfonic acids, sulfuric acid esters of fatty alcohols, condensation products of fatty acids with degradation products of albumin, products obtained by the reaction of alkylene oxides with acids of high molecular weight, alcohols, amines or the like. The effect of these substances or the mixtures thereof may be increased by adding dispersing agents such as waste sulfite cellulose liquor, mucilage, water soluble alkyl celluloses, polyvinyl alcohol, tragacanth or the like.

Instead of the condensation products of polyvinyl alcohol with carbonyl-compounds there may also be used other condensation products produced from carbonyl-compounds and products obtainable by partially saponifying an organic polyvinyl ester, for instance the condensation products of aldehydes or ketones with partially saponified organic polyvinyl esters such as polyvinyl formiate, polyvinyl acetate, polyvinyl propionate, polyvinl butyrate.

The following examples serve to illustrate the invention, but they are not intended to limit it thereto, the parts being by weight:—

(1) In a boiler provided with a stirring device 360 parts of methylene chloride are introduced, 44 parts of polyvinyl alcohol are added, while stirring, and 22 parts of acetaldehyde are then introduced, while adding some drops of concentrated hydrochloric acid to serve as a catalyst. The mixture is heated to boiling and the water which has been formed during the reaction is removed by azeotropic distillation. As the reaction progresses the polyvinyl alcohol disappears and the acetal formed dissolves in the methylene chloride. The reaction is finished after about 24 hours. 240 parts of the solution in methylene chloride are then introduced in a fine jet, while rapidly stirring, into a solution of 2.4 parts of sodium isobutyl naphthalene sulfonate and 0.24 part of sodium carbonate in 240 parts of water. A fine white emulsion is formed from which the solvent is removed by introducing steam, while continuously stirring. After cooling the acetal dispersion is filtered with suction and washed. A fine white powder is obtained.

(2) In a manner similar to that described in Example 1 a solution of the corresponding acetal is obtained by the condensation of polyvinyl alcohol with butyraldehyde in carbon tetrachloride. 300 parts of this solution are emulsified with a solution of 250 parts of water, 4.8 parts of sodium isopropyl naphthalene sulfonate and 0.24 part of sodium carbonate. The solvent is distilled, while continuously stirring, the residue is cooled, filtered with suction and the acetal is washed. The acetal is obtained in the form of a fine white powder. If the percentage of the emulsifying agents in the emulsion is reduced by half, i. e. to about 1 per cent, the acetal is obtained in the form of a coarse-sandy to granular, porous product.

The acetals from polyvinyl alcohol and cyclohexanon are obtained in an analogous manner.

(3) The acetal is produced from highly viscous polyvinyl alcohol and formaldehyde in methylene chloride. 250 parts of a solution of 15 per cent strength are emulsified with a solution of 250 parts of water, 2.4 parts of a sulfonated fatty alcohol in the form of the sodium compound and 0.24 part of sodium carbonate and the emulsion is worked up as described above. There is obtained a coarse-grained, porous product. If the percentage of the emulsifying agent is increased to 2 per cent the acetal is precipitated in the form of a fine white powder.

(4) The corresponding acetal is prepared from highly viscous polyvinyl alcohol and octylaldehyde in methylene chloride or carbon terrachloride. 300 parts of the solution of 20 per cent strength are emulsified with a solution of 300 parts of water, 7.5 parts of the sodium salt of the product obtained by the reaction of oleic acid chloride and hydroxy ethane sulfonic acid and 0.66 part of sodium carbonate and the emulsion is worked up as described in the above examples. The acetal is obtained in the form of a fine, sandy, light yellow powder.

(5) In like manner mixed acetals are also readily isolated. An acetal of polyvinyl alcohol, acetaldehyde and butyraldehyde in any desired proportion is prepared in methylene chloride. 240 parts of the solution of 20 per cent strength are emulsified with the same weight of an emulsifying solution of for instance 240 parts of water, 16.8 parts of sodium isobutyl nahpthalene sulfonate, 5 parts of polyvinyl alcohol and 0.24 part of sodium carbonate. Analogously to the above examples the mixed acetal separates in the form of a fine white powder.

We claim:

1. In the process of preparing the condensation product of polyvinyl alcohol and acetaldehyde the step which comprises emulsifying in water a solution of said condensation product in methylene chloride in the presence of sodium isobutyl naphthalene sulfonate and distilling off the methylene chloride.

2. In the process of preparing the condensation product of polyvinyl alcohol and formaldehyde the step which comprises emulsifying in water a solution of said condensation product in methylene chloride in the presence of the sodium salt of a sulfonated fatty alcohol and distilling off the methylene chloride.

3. In the process of preparing the condensation products of carbonyl compounds selected from the group consisting of aldehydes and ketones with products obtained by saponifying a polyvinyl ester of an organic carboxylic acid the steps which comprise emulsifying in water in the presence of an emulsifying agent a solution of said condensation products in an organic water-insoluble solvent liquid at room temperature and atmospheric pressure and of a lower boiling point than water and distilling off the solvent.

4. In the process of preparing acetals of polyvinyl alcohols the steps which comprise emulsifying in water in the presence of an emulsifying agent a solution of said acetals in a chlorinated hydrocarbon liquid at room temperature and atmospheric pressure and of a lower boiling point than water and distilling off the solvent.

5. In the process of preparing acetals of polyvinyl alcohols the steps which comprise emulsifying in water in the presence of an emulsifying agent a solution of said acetals in a chlorinated methane liquid at room temperature and atmospheric pressure and distilling off the solvent.

6. In the process of preparing acetals of a partially saponified polyvinyl ester of an organic carboxylic acid the steps which comprise emulsifying in water in the presence of an emulsifying agent a solution of said acetals in an organic water-insoluble solvent liquid at room temperature and atmospheric pressure and of a lower boiling point than water and distilling off the solvent.

7. In the process of preparing acetals of polyvinyl alcohols the steps which comprise emulsifying in water in the presence of an emulsifying agent a solution of said acetals in an organic water-insoluble solvent liquid at room temperature and atmospheric pressure and of a lower boiling point than water and distilling off the solvent.

LUDWIG ORTHNER.
WILLY SELLE.